United States Patent [19]
Solitt et al.

[11] Patent Number: 4,917,459
[45] Date of Patent: Apr. 17, 1990

[54] JEWELRY DISPLAY DEVICE

[76] Inventors: Samuel G. Solitt, 2121 Brookshire Rd.; Jerry Shaw, 50 W. Fairlawn Blvd., both of Akron, Ohio 44313

[21] Appl. No.: 237,066

[22] Filed: Aug. 29, 1988

[51] Int. Cl.$^4$ .......................... B65D 1/36; G02B 7/02
[52] U.S. Cl. ..................................... 350/235; 206/566
[58] Field of Search ............... 350/235, 237, 238, 239, 350/240; 206/566

[56] References Cited

U.S. PATENT DOCUMENTS

| | | |
|---|---|---|
| 371,457 | 10/1887 | Hersh . |
| 1,593,176 | 7/1926 | Johnson . |
| 1,880,484 | 10/1932 | Rathbun .............................. 350/235 |
| 2,171,054 | 8/1939 | Williams .................................. 40/33 |
| 2,176,329 | 10/1939 | Chambers . |
| 2,533,747 | 12/1950 | Thienemann . |
| 3,936,156 | 2/1976 | Shaw et al. .......................... 350/235 |
| 3,937,320 | 2/1976 | Chao et al. ........................... 206/566 |
| 4,084,216 | 4/1978 | Shonting .............................. 350/235 |
| 4,371,077 | 2/1983 | Solitt et al. .......................... 206/566 |
| 4,387,806 | 6/1983 | Poole et al. .......................... 206/566 |
| 4,432,456 | 2/1984 | Ovadia et al. ........................ 206/566 |
| 4,538,727 | 9/1985 | Solloway ............................. 206/566 |

FOREIGN PATENT DOCUMENTS 666604 8/1988 Switzerland ........................ 206/566

Primary Examiner—Bruce Y. Arnold
Assistant Examiner—Martin Lerner
Attorney, Agent, or Firm—Reese Taylor

[57] ABSTRACT

A viewing and display device includes a base with an upright frame projecting from at least some edge surfaces thereof. Light means are mounted on the frame in overlying relationship with the base and magnifying means are also mounted on the frame and project in overlying relationship with the base. Mirrors or other reflecting means are carried on one surface of the frame facing the base and carrying handles are mounted on the opposed surface of the frame. Power supply means are provided so that the light is battery operated and also activated by pressure on the base.

9 Claims, 2 Drawing Sheets

JEWELRY DISPLAY DEVICE

BACKGROUND OF THE INVENTION

This invention relates in general to the field of product merchandising and relates in particular to an improved device for displaying and examining jewelry or similar objects.

DESCRIPTION OF THE PRIOR ART

In the merchandising field, it is generally desirable to provide some means whereby the merchandise can be displayed and observed by the prospective purchaser in the most favorable conditions. Such a capability enhances the impression the merchandise makes on the purchaser and facilitates sales.

There are a number of prior art patents which in general disclose showcases or means for displaying and examining merchandise. Examples can be seen in Hersh U.S. Pat. Nos. 371,457; Johnson 1,593,176; Williams 2,171,054; and Chambers 2,176,329.

These patents disclose various devices for facilitating the display, inspection and viewing of various articles of commerce including, in some instances, jewelry. They also disclose various uses of mirrors and lights to facilitate the viewing.

In the merchandising of jewelry, the general concepts previously noted are perhaps even more important. Since jewelry tends to be relatively expensive and since its sales appeal is often influenced by the impression it creates when actually worn by the purchaser, the capability of clearly and accurately viewing the article becomes even more important.

Shaw U.S. Pat. No. 3,936,156 is perhaps the most relevant of the patent art in that it discloses a combined display and viewing device intended to be used in connection with the sale of jewelry or similar articles and including an upstanding, three-sided frame member having mirrors mounted on one surface thereof and an adjustable magnifying means and light source mounted thereon so that a piece of jewelry, such as, for example, a ring, can be viewed from various perspectives due to the mirrors, can be viewed with clarity due to the light source and can be viewed in detail due to the presence of the magnifying means.

While all of the aforementioned prior art, and particularly Shaw U.S. Pat. No. 3,936,156, are presumably effective for the purposes for which they are designed, it is believed that still further improvements in this field can be made.

Specifically, it is believed to be desirable to provide a portable device of this general nature not necessarily limited to use adjacent a wall outlet, to provide a device with a removable pad for the display of bracelets, et., and to provide a device wherein the light source is more or less automatically actuated. The preferred general atmosphere in which jewelry is presented makes these features important since they combine to create a subdued yet elegant setting for the inspection of the article.

SUMMARY OF THE INVENTION

As previously suggested, particularly in the field of jewelry sales, it is often advantageous to enable the prospective purchaser to examine the jewelry in detail, such as by means with magnifying glass, and to permit examination of the impression the jewelry will have when worn by utilization of reflective means, such as mirrors.

It has been found that an improved display device can be provided wherein a base having a unique, planar configuration and carrying a soft viewing pad can be provided. This base can be provided with a frame surrounding one or more sides of the base and projecting upwardly therefrom and carrying a light source and a magnifying means.

It has been found that examination of the jewelry and use of the display device can be greatly enhanced by providing a magnifying means which is adjustable in a number of directions.

It has been found that utility and appearance of such device can further be improved by providing a battery-operated operation wherein no external power source is required, although an optional external power source can also be provided.

It has further been found that the effectiveness of the display device can be improved by providing an on/off switch sensitive to pressure on the viewing pad so that the light source is automatically activated when the purchaser touches the pad.

It has been found that the utility of the device can further be improved by providing a timed light source so that upon release of the pressure on the pad, the light source will switch off at a predetermined time.

It has further been found that the utility of the improved device can be improved by providing carrying handles integral therewith.

It has finally been found that the utility of the device can be improved by providing a secondary viewing pad which is releasably attached to the frame during normal usage, but which can be removed and utilized either as a free-standing viewing device of its own or superimposed upon the pad which is normally carried on the base of the viewing device so as to accentuate the article being viewed.

Accordingly, production of an improved viewing device of the character above-described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
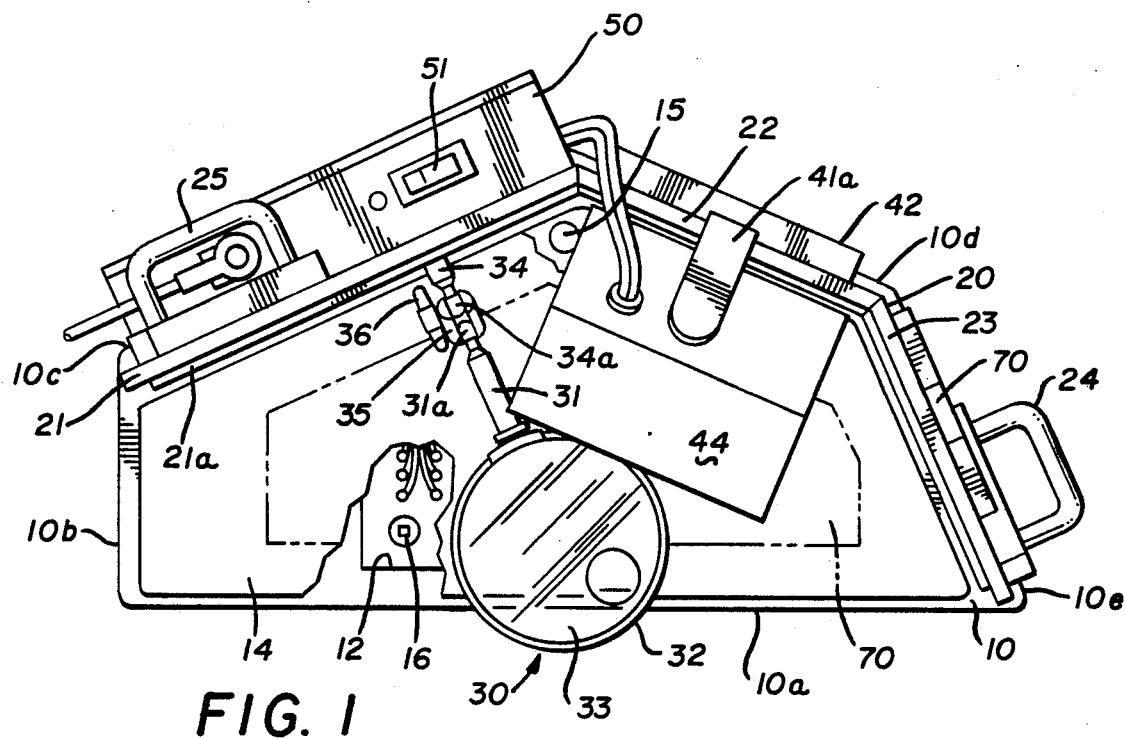
FIG. 1 is a top plan view of the improved viewing device partially broken away.
Figure 2:
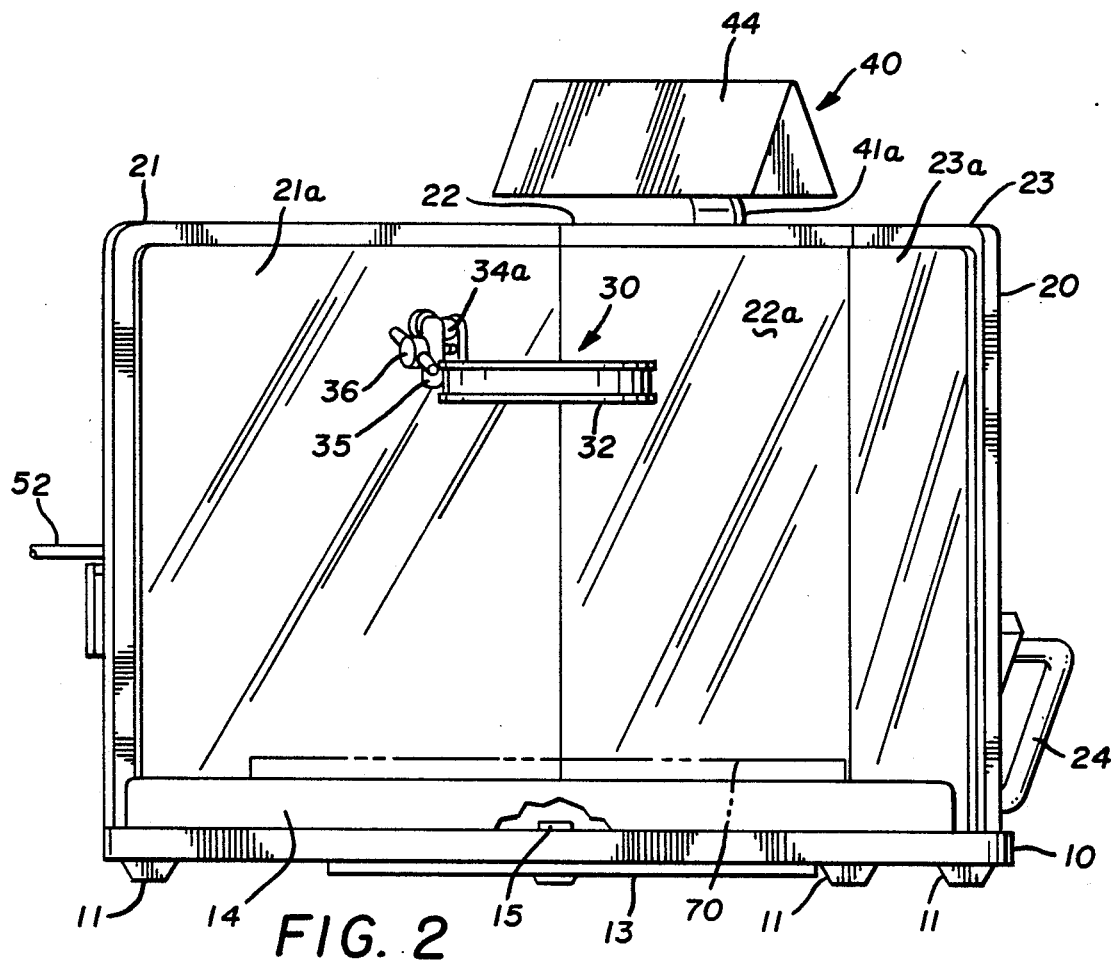
FIG. 2 is a front elevational view of the improved viewing device partially broken away.
Figure 3:
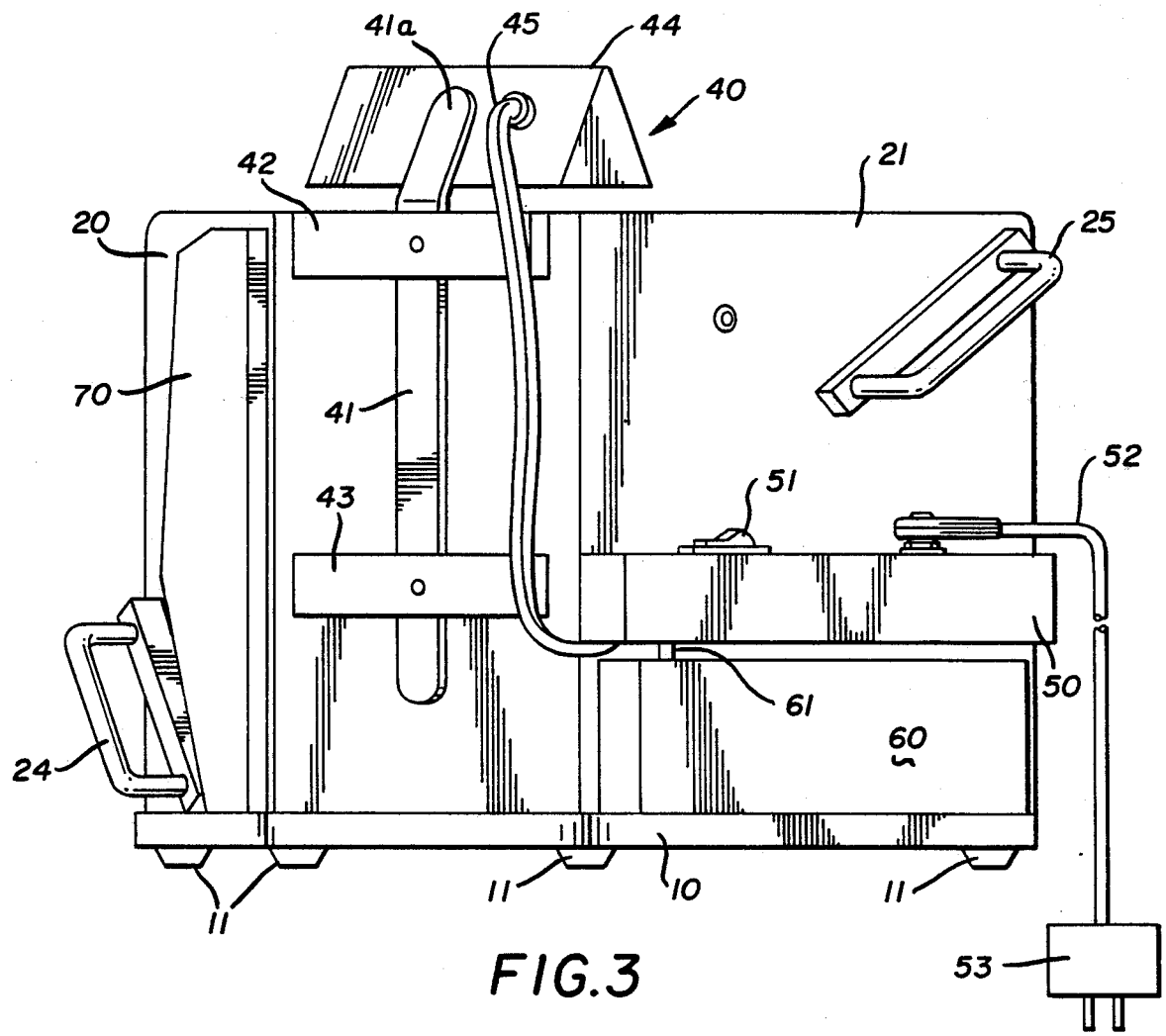
FIG. 3 is a rear elevational view of the improved viewing device.

Referring first to FIG. 1 of the drawings, it will be seen that the improved display device includes a base 10. This base is irregular in planar configuration and generally presents a straight front edge 10a, a first side edge 10b extending from one end of front edge 10a and disposed at right angles to the front edge and second, third and fourth side edges 10c, 10d and 10e which angle away from the first side edge 10b and the other end of the front edge 10a so as to form a generally U-shaped planar configuration between themselves. The result is a pentagonal base.

The base 10 also includes support legs 11,11 disposed on its bottom surface and a central recess 12. This recess 12 forms a compartment 13 for receipt of the electronic means which control the operation of the light source, as will be described in greater detail below, and makes it possible to locate these means unobtrusively so as to not detract from the appearance of the overall device.

Also received on the top surface of the base 10 is a viewing pad 14 which generally will be constructed to have a pentagonal planar configuration corresponding to the planar configuration of the base 10, as can clearly be seen in FIG. 1 of the drawings. This pad 14 is releasably received on the base 10 and temporarily secured thereto by Velcro pads 15 which are disposed at predetermined spots about the surface of the base 10. In this way, the pad 14 overlies the recess 12 which contains the wiring means and the pad is also generally covered with felt or some soft material compatible with the jewelry tray or display pad. It, therefore, presents a soft, rich looking surface upon which the hand of the viewer can be placed, or upon which the jewelry articles can be placed.

A pressure sensitive on/off switch 16 is carried in the compartment 13 beneath the pad 14. This switch is, therefore, actuated by pressure on the pad 14 which depresses the switch and actuates the light means 40 which will be described in greater detail below. Release of pressure on the pad 14 permits the normally open switch to return to the open position, thereby inactivating the light source. It is possible to build timing means into the switching mechanism so that, upon release of pressure on pad 14, the light will switch off after a predetermined interval.

The frame 20 surrounds the pad 14 on three sides of the base 10. This frame includes frame sections 21, 22 and 23 which extend upwardly from edge surfaces 10a, 10d and 10e. The front faces of these frame sections carry mirrors, or other reflecting means, 21a 22a and 23a and the result is a generally U-shaped viewing area which tends to focus the attention of the viewer on the article being observed. The positioning of the mirrors also makes it possible to view the article from different perspectives.

The rear surfaces of frame sections 20 and 21 have secured thereto carrying handles 24 and 25 and section 20 also receives the secondary viewing pad 70 adjacent the handle 24. This pad is again releasably secured to the frame member 20 by Velcro or other suitable releasable means and has a planar configuration generally conforming to that of the base 10 and pad 14, as shown in FIG. 1 of the drawings. This pad can thus be stored out of sight when not in use and can be used either on the counter surface or on pad 14 as desired. It also preferably has a soft, plush covering in keeping with the desired overall impression being created.

Also carried on the rear of frame 20 is illumination means 40 which include a vertical support member 41 held in place by brackets 42 and 43. The projecting end 41a of the support member is angled so as to project over the base 10 and carries a canopy or shield 44 which covers the actual light bulb (not shown). An electrical cord 45 leads from the light source 40 to the power source 50 which is also mounted on the rear of the frame member 21. All of this structure is thus essentially hidden from view thereby preserving the uncluttered appearance of the viewing area.

A battery 60 of the rechargeable type is also mounted on the rear of the frame section 21 and connected by means of the cord 61 to the power source 50. Power source 50 also carries on/off switch 51 which activates the entire electrical circuitry. The power source 50 also receives an electrical cord 52 which leads to an AC adaptor/transformer 53 so that the device can be operated, if desired, on either direct or alternating current. This also makes it possible to recharge the battery 60.

Mounted on frame section 21 is viewing and magnifying means 30 which includes a frame 32 and magnifying glass 33 with frame 30 being attached to arm 31. The arm 31 is, in turn, connected to a mounting arm 34 which projects from frame section 21. Mounting arm 34 terminates in a ball 34a a and arm 31 also terminates in ball 31a. The arms are interconnected by bracket 35 which has opposed sockets for reception of balls 31a and 34a. In this fashion, the means 30 can be moved through various planes to provide the desired viewing perspective. Movement can be prevented and the position of means 30 fixed by tightening screw 36.

In utilization of the improved display device and assuming that a ring is the article under consideration, the ring can be placed on the finger of the prospective purchaser who will then rest his or her hand on the pad 14. This pressure will activate the switch 16 which, in turn, will activate the light means 40. The viewer can then view the ring either through the magnifying means 30 or directly by eye or upon reflection from various perspectives through the mirrors 21a, 22a and 23a. Once the hand of the prospective purchaser is lifted from the pad 14, the light source will, after a predetermined interval, shut off.

If a different article is involved, such as, for example, a bracelet, the auxiliary or secondary viewing pad 70 can be removed from the rear of the frame member 20 and placed either on the counter top or on the top of the pad 14. The article of jewelry can then be laid on the pad and viewed in an obvious fashion.

It will be noted, as described above, that this apparatus is capable of battery operation in which event a very clean, net unit is presented with no unsightly wires or anything of that nature. Furthermore, the carrying handles and power sources are all in rear of the unit, again contributing to the streamlined general appearance. These factors are important in this industry, since the overall ambience of the atmosphere in which the articles are considered is important.

While a full and complete description of the invention has been set forth in accordance with the dictates of the Patent Statutes, it should be understood that modifications can be resorted to without departing from the spirit hereof or the scope of the appended claims.

Thus, it should be noted that the even though the display device described and claimed herein has essentially been described in connection with the viewing and display of jewelry items, it is obviously not necessarily so limited and would have utility in connection with the merchandising of other articles of merchandise as well.

What is claimed is:

1. A viewing and display device, comprising:
(a) a base having at least some edge surfaces:
(b) an upright frame projecting from at least some edge surfaces of said base;
(c) light means mounted on said frame in overlying relationship with said base;
(d) magnifying means mounted on said frame;
(e) reflective means carried on one surface of said frame;
(f) carrying means mounted on the opposed surface of said frame;

(g) power supply means carried on the same surface of said frame as said carrying means and operatively connected to said light means;
(h) said base having a recessed storage area;
(i) activating means for said light means disposed in said recessed storage area;
(j) a first display cushion releasably mounted on said base in normally covering relationship with said storage area; and
(k) said light means being activated by pressure on said first display means.

2. The view *and display device of claim 1 wherein a second display cushion is releasably carried by said frame.

3. The viewing and display device of claim 1 wherein said light means are activated for a predetermined time.

4. A viewing and display device, comprising:
(a) a base having a forward edge surface and one or more contiguous additional edge surfaces;
(b) an upright frame projecting from at least some of said additional edge surfaces of said base and having front and rear surfaces;
(C) light means mounted on said frame in overlying relationship with said base;
(d) magnifying means mounted on said front surface of said frame and projecting toward said forward edge surface;
(e) reflective means carried on said front surface of said frame;
(f) at least one carrying handle mounted on said rear surface of said frame;
(g) power supply means carried on the same surface of said frame as said carrying means and operatively connected to said light means;
(h) activating means carried by said base and operatively connected to said power supply means; and
(i) a first display cushion releasably mounted on said base for movement into and out of engagement with said activating means in response to pressure on said cushion.

5. The viewing and display device of claim 4 wherein a second display cushion is releasably carried by said frame on said second surface of said frame.

6. The viewing and display device of claim 4 wherein said light means are activated for a predetermined time by pressure on said first display cushion.

7. The viewing and display device of claim 4 wherein said base has a recessed storage area.

8. The viewing and display device of claim 7 wherein said first display cushion is normally disposed in covering relationship with said storage area.

9. The viewing and display device of claim 8 wherein said activating means are carried in said recessed storage area.

* * * * *

UNITED STATES PATENT AND TRADEMARK OFFICE
CERTIFICATE OF CORRECTION

PATENT NO. : 4,917,459

DATED : April 17, 1990

INVENTOR(S) : Samuel G. Solitt and Jerry Shaw

It is certified that error appears in the above-identified patent and that said Letters Patent is hereby corrected as shown below:

In Column 1, Line 56, delete "et." and substitute therefor --etc.--.

In Column 3, Line 36, delete "21a22a" and substitute therefor --21a,22a--.

In Column 4, Line 11, delete "34a a and" and substitute therefor --34a and--.

In Column 4, Line 38, delete "net" and substitute therefor --neat--.

In Column 5, Line 12, delete "view *and" and substitute therefor --viewing and--.

Signed and Sealed this

Ninth Day of July, 1991

Attest:

HARRY F. MANBECK, JR.

Attesting Officer

Commissioner of Patents and Trademarks